US012542393B2

(12) United States Patent
Chen et al.

(10) Patent No.: US 12,542,393 B2
(45) Date of Patent: Feb. 3, 2026

(54) SOCKET WITH SAFETY SHUTTER

(71) Applicant: Jiangsu Barep Smart Technology Co., Ltd, Zhangjiagang (CN)

(72) Inventors: Jiangang Chen, Zhangjiagang (CN); Xiaobo Zheng, Zhangjiagang (CN)

(73) Assignee: Jiangsu Barep Smart Technology Co., Ltd, Zhangjiagang (CN)

(*) Notice: Subject to any disclaimer, the term of this patent is extended or adjusted under 35 U.S.C. 154(b) by 297 days.

(21) Appl. No.: 18/340,002

(22) Filed: Jun. 22, 2023

(65) Prior Publication Data

US 2023/0335936 A1 Oct. 19, 2023

(51) Int. Cl.

| | |
|---|---|
| ***H01R 13/453*** | (2006.01) |
| ***H01R 13/502*** | (2006.01) |
| ***H01R 25/00*** | (2006.01) |
| ***H01R 103/00*** | (2006.01) |

(52) U.S. Cl.

CPC ....... *H01R 13/4534* (2013.01); *H01R 13/502* (2013.01); *H01R 25/006* (2013.01); *H01R 2103/00* (2013.01)

(58) Field of Classification Search

CPC .............. H01R 13/4534; H01R 13/502; H01R 2103/00; H01R 25/006

USPC .......................................................... 439/137

See application file for complete search history.

(56) References Cited

U.S. PATENT DOCUMENTS 7,642,457 B2 * 1/2010 Weeks ............... H01R 13/4534 439/106
7,645,149 B2 * 1/2010 Carbone ............ H01R 13/4534 439/137
7,790,982 B2 * 9/2010 Weeks ................. H01R 13/665 174/59
7,869,171 B2 * 1/2011 Weeks ............... H01R 13/4534 361/42
7,887,346 B1 * 2/2011 Huang ............... H01R 13/4534 439/140
8,193,445 B2 * 6/2012 Li .......................... H01R 24/78 174/53
9,444,238 B1 * 9/2016 Savicki, Jr. .............. H02G 3/14
2012/0170292 A1 * 7/2012 Bhosale ............... H01R 13/717 362/415
2015/0064944 A1 * 3/2015 Scanzillo ........... H01R 13/4534 439/137
2017/0077623 A1 3/2017 Kamo et al.
2018/0019543 A1 1/2018 Yayama et al.
2019/0372253 A1 12/2019 Kawabata et al.
2020/0067240 A1 * 2/2020 Close .................. H01R 25/006

(Continued)

*Primary Examiner* — Gary F Paumen

(74) *Attorney, Agent, or Firm* — Zhigang Ma

(57) ABSTRACT

The present disclosure discloses a socket with a safety shutter, including a safety shutter device, a socket upper cover, and a socket base; the safety shutter device includes a base plate, and a first sliding structure, a second sliding structure, and a third sliding structure which are slidably connected in the base plate; the first sliding structure and the second sliding structure are connected in an interpenetrating manner; a plurality of jack groups are formed in the socket upper cover; each jack group includes a grounding jack, an I-shaped jack, and a T-shaped jack; and the socket base is provided with a grounding conducting plate, a first conducting plate, and a three-pin second conducting plate corresponding to the T-shaped jack.

9 Claims, 12 Drawing Sheets

(56) References Cited

U.S. PATENT DOCUMENTS

| | | | | |
|---|---|---|---|---|
| 2023/0082696 A1* | 3/2023 | Quan | ........................ | H02G 3/18<br>439/137 |

* cited by examiner

SOCKET WITH SAFETY SHUTTER

TECHNICAL FIELD

The present disclosure relates to the technical field of electrical connectors, and particularly, to a socket with a safety shutter.

BACKGROUND

Wall sockets or extension cord sockets commonly used in daily life are usually provided with one or more groups of jacks, including a two-jack form or a three-jack form. In use, it can be easily found that due to an open jack, a conducting plate in a socket is easily corroded due to the influence of air humidity, and the conductivity may be affected by dust accumulated in the socket. There are many hidden dangers in this type of socket. A particular disadvantage is that under an improper operation or due to the curiosity of children, a conductive foreign matter may be plugged into the socket, leading to electric shock accidents, which endangers the life and property safety. In addition, some existing sockets have extremely complex structures. Although these sockets can effectively solve the above problems, it is difficult to assemble, disassemble, and repair the sockets. A fixed structure of a shell has insufficient stability. Furthermore, a safety shutter component is prone to misalignment, leading to overall locking of a safety shutter.

SUMMARY

The present disclosure aims to provide a socket with a safety shutter to solve the following problems: aging of electrical elements because a conducting plate in a socket is easily affected by substances such as external dust and water vapor, a risk of electric shock caused by an improper operation performed on the socket or plugging of a foreign matter, difficulty in assembling, disassembling, and repair caused by a complicated structure, and overall locking of a safety shutter because of insufficient stability of a fixed structure of a shell and easy misalignment of a safety shutter component.

In order to achieve the above objectives, the present disclosure adopts the following technical solution: A socket with a safety shutter includes a safety shutter device, a socket upper cover, and a socket base; the safety shutter device includes a base plate, and a first sliding structure, a second sliding structure, and a third sliding structure which are slidably connected in the base plate; the first sliding structure and the second sliding structure are connected in an interpenetrating manner; a plurality of jack groups are formed in the socket upper cover; each jack group includes a grounding jack, an I-shaped jack, and a T-shaped jack; gaps of a reset button and a test button are further formed in the socket upper cover; and the socket base is provided with a grounding conducting plate and a first conducting plate corresponding to the grounding jack and the I-shaped jack in sequence, and a second conducting plate corresponding to the T-shaped jack.

As a further description of the above-mentioned technical solution:

The base plate includes a plurality of sliding block slots and connecting rods between the sliding block slots; and each sliding block slot is provided with a reverse placement prevention bulge portion, a first limiting bulge portion, a second limiting bulge portion, and a third limiting bulge portion.

As a further description of the above-mentioned technical solution:

The first sliding structure includes a first Z-shaped side plate, a first sliding block, and a second sliding block; the first sliding block is fixed at an upper end of the first Z-shaped side plate; the second sliding block is fixed at a lower end of the first Z-shaped side plate; the first sliding block is slidably connected into a first sliding chute of the base plate and is connected to the second limiting bulge portion through a first spring; and the second sliding block is slidably connected into a second sliding chute of the base plate.

As a further description of the above-mentioned technical solution:

A first trapezoid convex block and a first guide inclined block are arranged on the first sliding block.

As a further description of the above-mentioned technical solution:

The second sliding structure includes a second Z-shaped side plate, a third sliding block, and a fourth sliding block; the third sliding block is fixed at an upper end of the second Z-shaped side plate; the fourth sliding block is fixed at a lower end of the second Z-shaped side plate; the third sliding block is slidably connected into the first sliding chute of the base plate and is connected to the third limiting bulge portion through a second spring; and the fourth sliding block is slidably connected into the second sliding chute of the base plate.

As a further description of the above-mentioned technical solution:

A second trapezoid convex block and a second guide inclined block are arranged on the fourth sliding block.

As a further description of the above-mentioned technical solution:

A limiting block is arranged at a front end of the second sliding structure; the third sliding structure is provided with a groove in a relative position of the limiting block; the third sliding structure is provided with a guide sliding chute; and the guide sliding chute is slidably connected to a guide bulge portion in each sliding block slot.

As a further description of the above-mentioned technical solution:

The first sliding block is higher than the third sliding block; the second sliding block is lower than the fourth sliding block; the second sliding block resists against a bottom of the second Z-shaped side plate; and the third sliding block resists against a bottom of the first Z-shaped side plate.

As a further description of the above-mentioned technical solution:

The socket base is further provided with a connecting plate, a test button vertically penetrating through the connecting plate, and a reset button connected through an elastic member.

As a further description of the above-mentioned technical solution:

The socket upper cover is clamped on a clamping member of the socket base through a fastener; and the socket upper cover sleeves a mounting block of the socket base through a plurality of mounting guide slots.

In summary, due to the adoption of the above technical solution, compared with the prior art, the present disclosure has the following beneficial effects:

1. The socket can better adapt to an ordinary two-pole plug (for example, a standard 5-15P plug) and a T-shaped plug (for example, a standard 5-20P plug). Furthermore, under the protection of the sliding structures of the safety shutter, a plug is easily plugged into the socket and fixed; substances such as external dust and water in air can be effectively isolated; and aging of electrical elements inside the socket is relieved.

2. Since the first sliding structure and the second sliding structure are connected in the interpenetrating manner, the structure is stable. During use, the two sliding structures are not easily misaligned, which avoids locking of the safety shutter device. A two-pole plug can be normally plugged into the socket, and a foreign matter can be prevented from being plugged into the I-shaped jack or the T-shaped jack alone, so as to avoid the foreign matter from being plugged into a conducting plate, leading to a danger of electric shock or the like.

3. The base plate is provided with the reverse placement prevention bulge portion, so that problems, caused by reverse placement of the safety shutter device, that a plug cannot be plugged into a jack and that the socket is damaged when a plug is plugged are avoided. The fastener and the mounting guide slot on the socket upper cover respectively cooperate with the clamping member and the mounting block on the socket base, so that a socket unit is convenient to assemble and disassemble, and has relatively good stability.

ILLUSTRATIONS IN THE DRAWINGS

Figure 1:
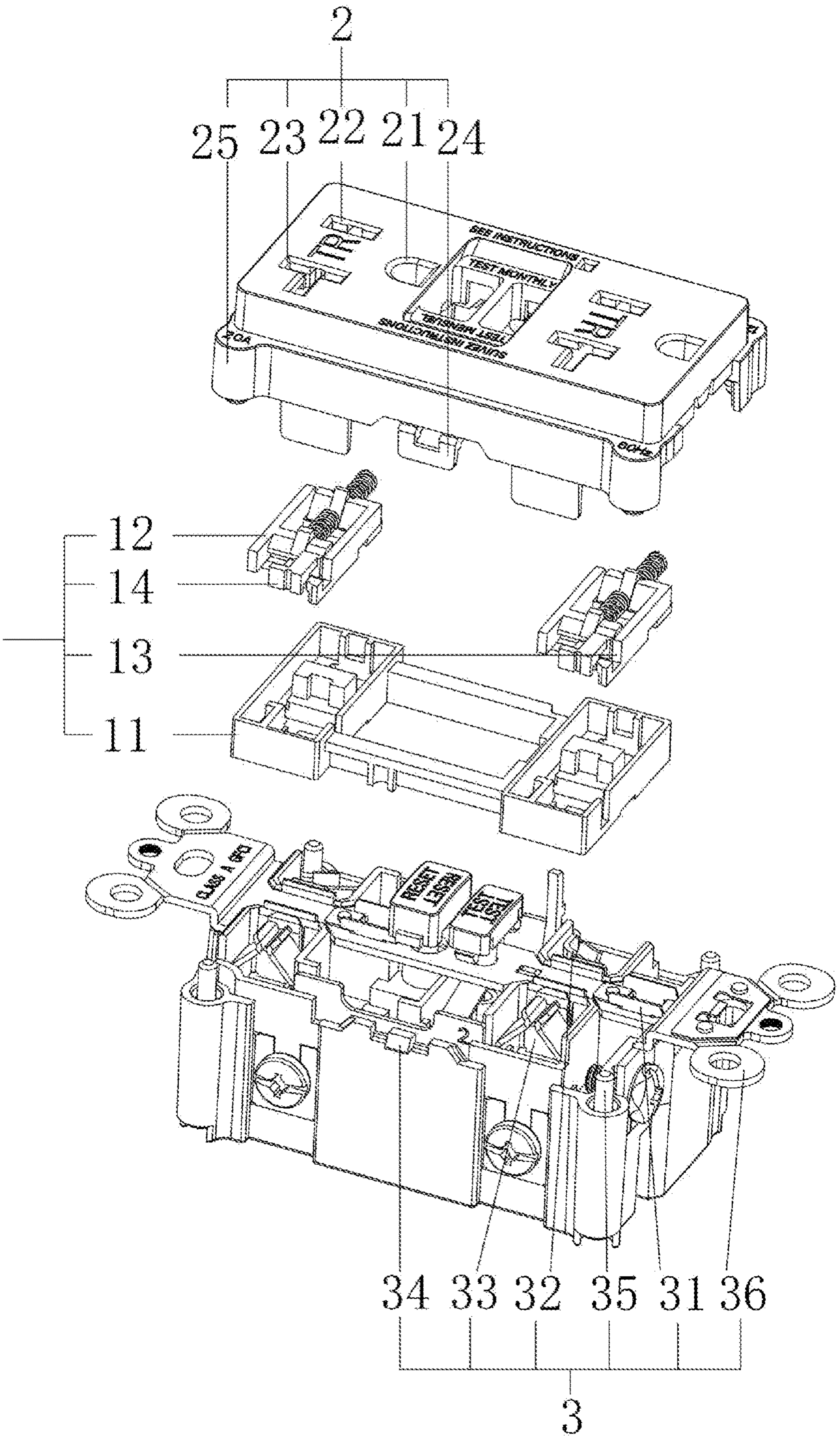
FIG. 1 is an exploded diagram of a socket with a safety shutter.
Figure 2:
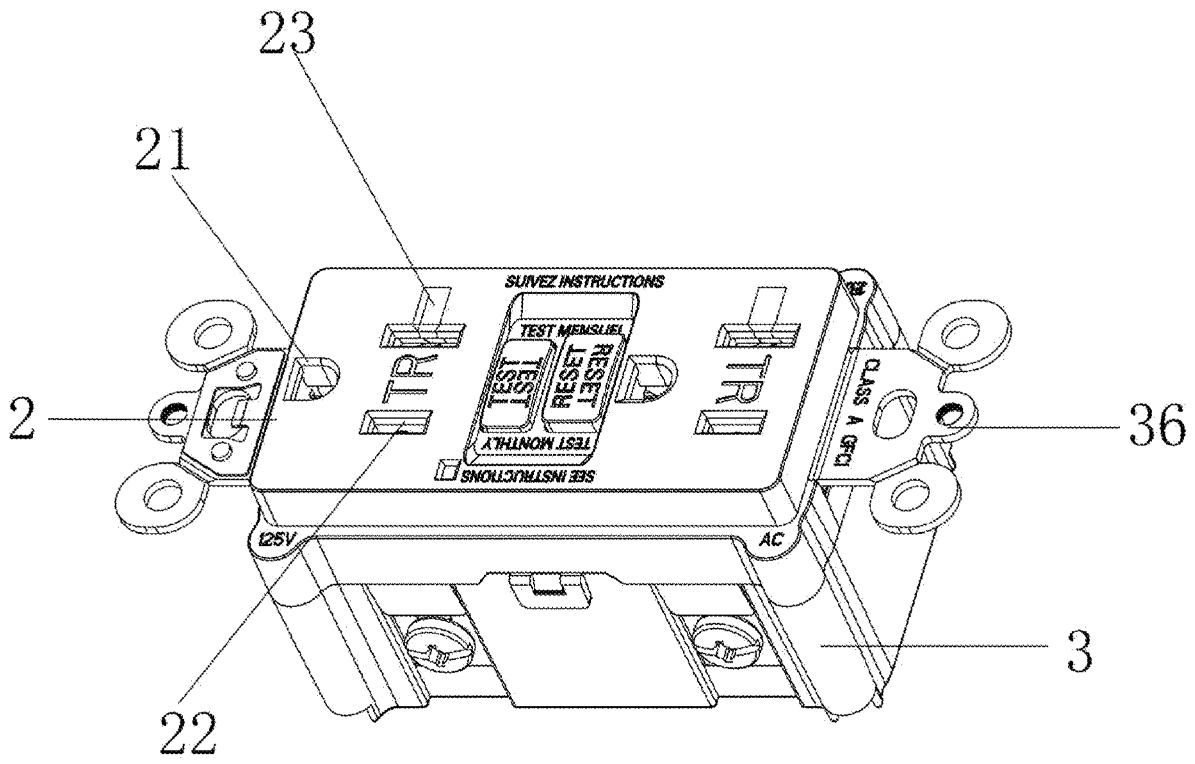
FIG. 2 is a three-dimensional diagram of a socket with a safety shutter.
Figure 3:
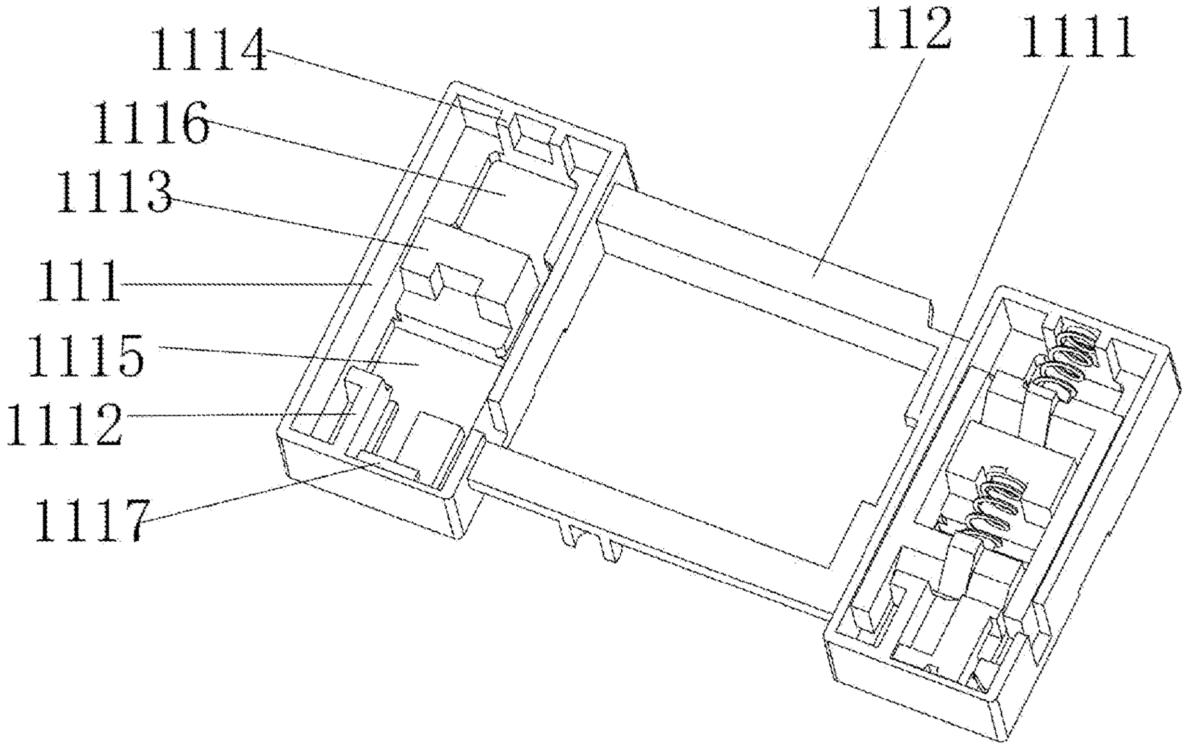
FIG. 3 is a three-dimensional diagram of a connection relationship of a base plate, a first sliding structure, a second sliding structure, and a third sliding structure in a socket with a safety shutter.
Figure 4:
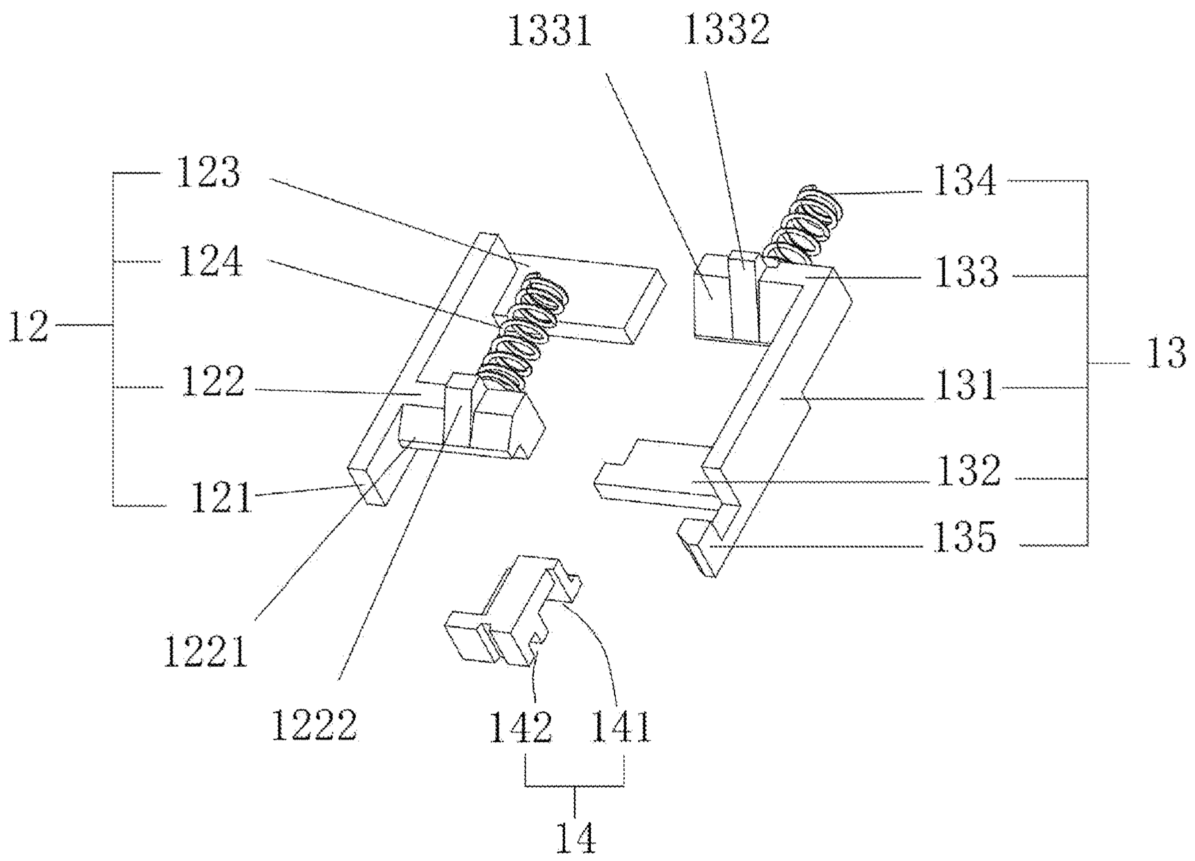
FIG. 4 is an exploded diagram of a first sliding structure, a second sliding structure, and a third sliding structure in a socket with a safety shutter.

1: safety shutter device; 11: base plate; 111: sliding block slot; 1111: reverse placement prevention bulge portion; 1112: first limiting bulge portion; 1113: second limiting bulge portion; 1114: third limiting bulge portion; 1115: first sliding chute; 1116: second sliding chute; 1117: guide bulge portion; 112: connecting rod; 12: first sliding structure; 121: first Z-shaped side plate; 122: first sliding block; 1221: first trapezoid convex block; 1222: first guide inclined block; 123: second sliding block; 124: first spring; 13: second sliding structure; 131: second Z-shaped side plate; 132: third sliding block; 133: fourth sliding block; 1331: second trapezoid convex block; 1332: second guide inclined block; 134: second spring; 135: limiting block; 14: third sliding structure; 141: groove; 142: guide sliding chute; 2: socket upper cover; 21: grounding jack; 22: I-shaped jack; 23: T-shaped jack; 24: fastener; 25: mounting guide slot; 3: socket base; 31: grounding conducting plate; 32: first conducting plate; 33: second conducting plate; 34: clamping member; 35: mounting block; 36: connecting plate.

DETAILED DESCRIPTION OF THE EMBODIMENTS

Referring to FIG. 1 to FIG. 5, the present disclosure provides a technical solution: A socket with a safety shutter includes a safety shutter device 1, a socket upper cover 2, and a socket base 3. The safety shutter device 1 includes a base plate 11, and a first sliding structure 12, a second sliding structure 13, and a third sliding structure 14 which are slidably connected in the base plate 11. The first sliding structure 12 and the second sliding structure 13 are connected in an interpenetrating manner, so that the safety shutter has a more stable structure. A plurality of jack groups are formed in the socket upper cover 2. Each jack group includes a grounding jack 21, an I-shaped jack 22, and a T-shaped jack 23. Gaps of a reset button and a test button are further formed in the socket upper cover 2. The socket base 3 is provided with a grounding conducting plate 31 and a first conducting plate 32 corresponding to the grounding jack 21 and the I-shaped jack 22 in sequence, and a second conducting plate 33 corresponding to the T-shaped jack 23. The jack groups can better adapt to an ordinary two-pole plug (for example, a standard 5-15P plug) and a T-shaped plug (for example, a standard 5-20P plug). Furthermore, under the protection of the sliding structures of the safety shutter, a plug is easily plugged into the socket and fixed; substances such as external dust and water in air can be effectively isolated; and aging of electrical elements inside the socket is relieved.

Figure 8:
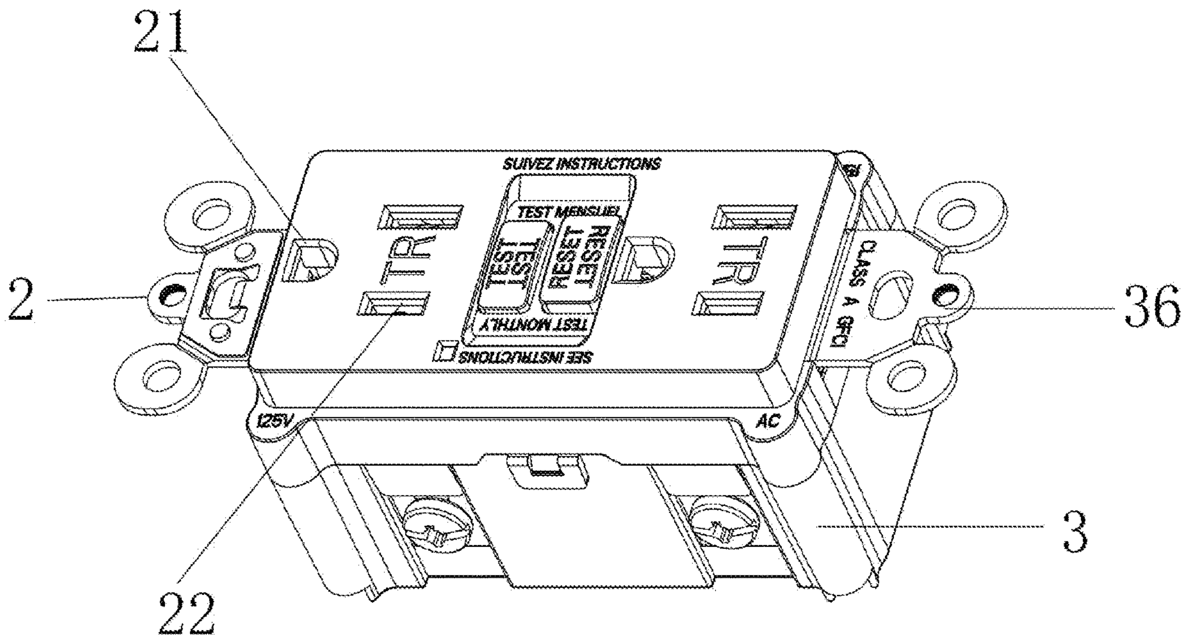
FIG. 8 is a three-dimensional diagram of another embodiment of a socket with a safety shutter.

Referring to FIG. 8, in another embodiment, positive and negative jacks on the socket upper cover 2 can all use the I-shaped jacks 22 which are only applicable for the ordinary two-pole plug.

The base plate 11 includes a plurality of sliding block slots 111 and connecting rods 112 between the sliding block slots 111. Each sliding block slot 111 is provided with a reverse placement prevention bulge portion 1111, a first limiting bulge portion 1112, a second limiting bulge portion 1113, and a third limiting bulge portion 1114. Problems, caused by reverse placement of the safety shutter device, that a plug cannot be plugged into a jack and that the socket is damaged when a plug is plugged are avoided.

The first sliding structure 12 includes a first Z-shaped side plate 121, a first sliding block 122, and a second sliding block 123. The first sliding block 122 is fixed at an upper end of the first Z-shaped side plate 121. The second sliding block 123 is fixed at a lower end of the first Z-shaped side plate 121. The first sliding block 122 is slidably connected into a first sliding chute 1115 of the base plate 11 and is connected to the second limiting bulge portion 1113 through a first spring 124. The second sliding block 123 is slidably connected into a second sliding chute 1116 of the base plate 11.

A first trapezoid convex block 1221 and a first guide inclined block 1222 are arranged on the first sliding block 122. The second sliding structure 13 includes a second Z-shaped side plate 131, a third sliding block 132, and a fourth sliding block 133. The third sliding block 132 is fixed at an upper end of the second Z-shaped side plate 131. The fourth sliding block 133 is fixed at a lower end of the second Z-shaped side plate 131. The third sliding block 132 is slidably connected into the first sliding chute 1115 of the base plate 11 and is connected to the third limiting bulge portion 1114 through a second spring 134. The fourth sliding block 133 is slidably connected into the second sliding chute 1116 of the base plate 11. A second trapezoid convex block 1331 and a second guide inclined block 1332 are arranged on the fourth sliding block 133. A limiting block 135 is arranged at a front end of the second sliding structure 13. The third sliding structure 14 is provided with a groove 141 in a relative position of the limiting block 135. The third sliding structure 14 is provided with a guide sliding chute 142. The guide sliding chute 142 is slidably connected to a guide bulge portion 1117 in each sliding block slot 111. The first sliding block 122 is higher than the third sliding block 132. The second sliding block 123 is lower than the fourth sliding block 133. The second sliding block 123 resists against a bottom of the second Z-shaped side plate 131. The third sliding block 132 resists against a bottom of the first Z-shaped side plate 121. Since the first sliding structure and the second sliding structure are connected in the interpenetrating manner, the structure is stable. During use, the two sliding structures are not easily misaligned, which avoids locking of the safety shutter device. A two-pole plug can be normally plugged into the socket, and a foreign matter can be prevented from being plugged into the I-shaped jack or the T-shaped jack alone, so as to avoid the foreign matter from being plugged into a conducting plate, leading to a danger of electric shock or the like.

The socket base 3 is further provided with a connecting plate 36, a test button vertically penetrating through the connecting plate 36, and a reset button connected through an elastic member. It is convenient for connection of a plurality of socket units, and a quantity of jacks of a single socket is increased to meet a demand of users.

The socket upper cover 2 is clamped on a clamping member 34 of the socket base 3 through a fastener 24. The socket upper cover 2 sleeves a mounting block 35 of the socket base 3 through a plurality of mounting guide slots 25, so that the socket unit is fixed more stably and is convenient to assemble and disassemble.

Figure 5:
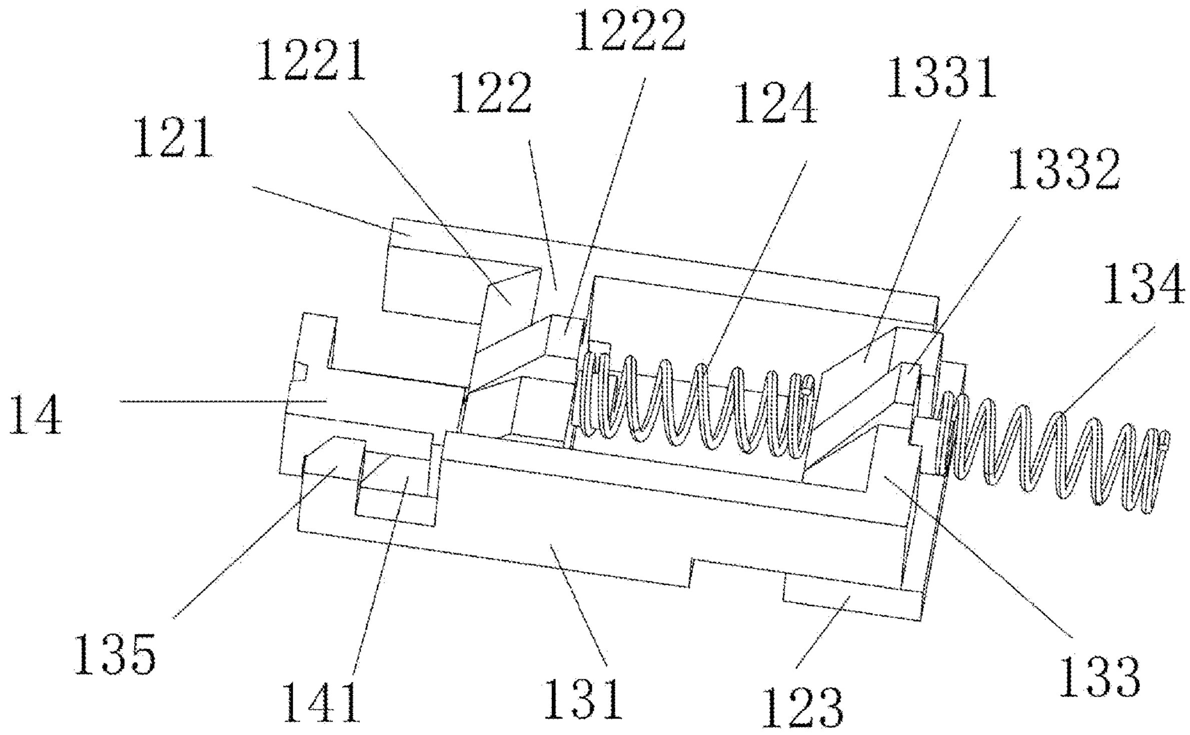
FIG. 5 is a three-dimensional diagram of a connection relationship of a first sliding structure, a second sliding structure, and a third sliding structure in a socket with a safety shutter.
Figure 6A:
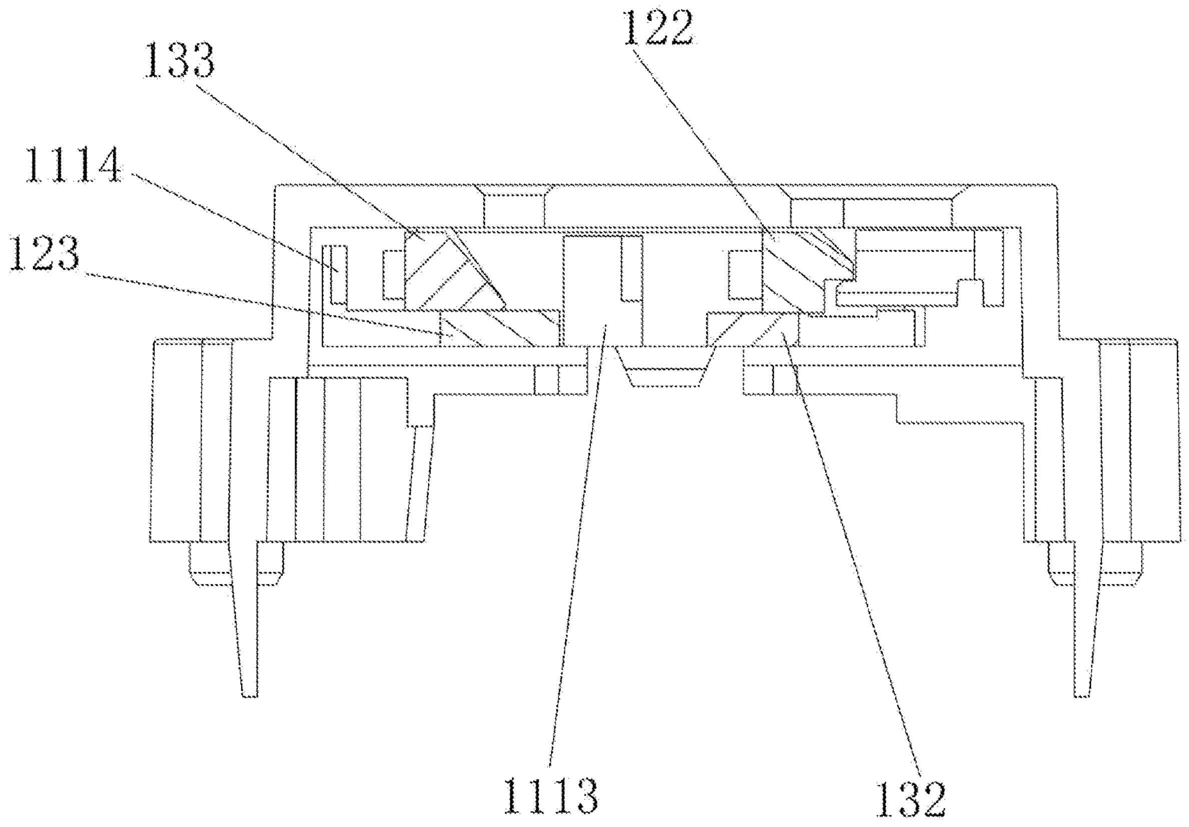
FIG. 6*a* and FIG. 6*b* are sectional views of a first sliding structure, a second sliding structure, a third sliding structure, a base plate, and a socket upper cover in a socket with a safety shutter in a first usage state.
Figure 6B:
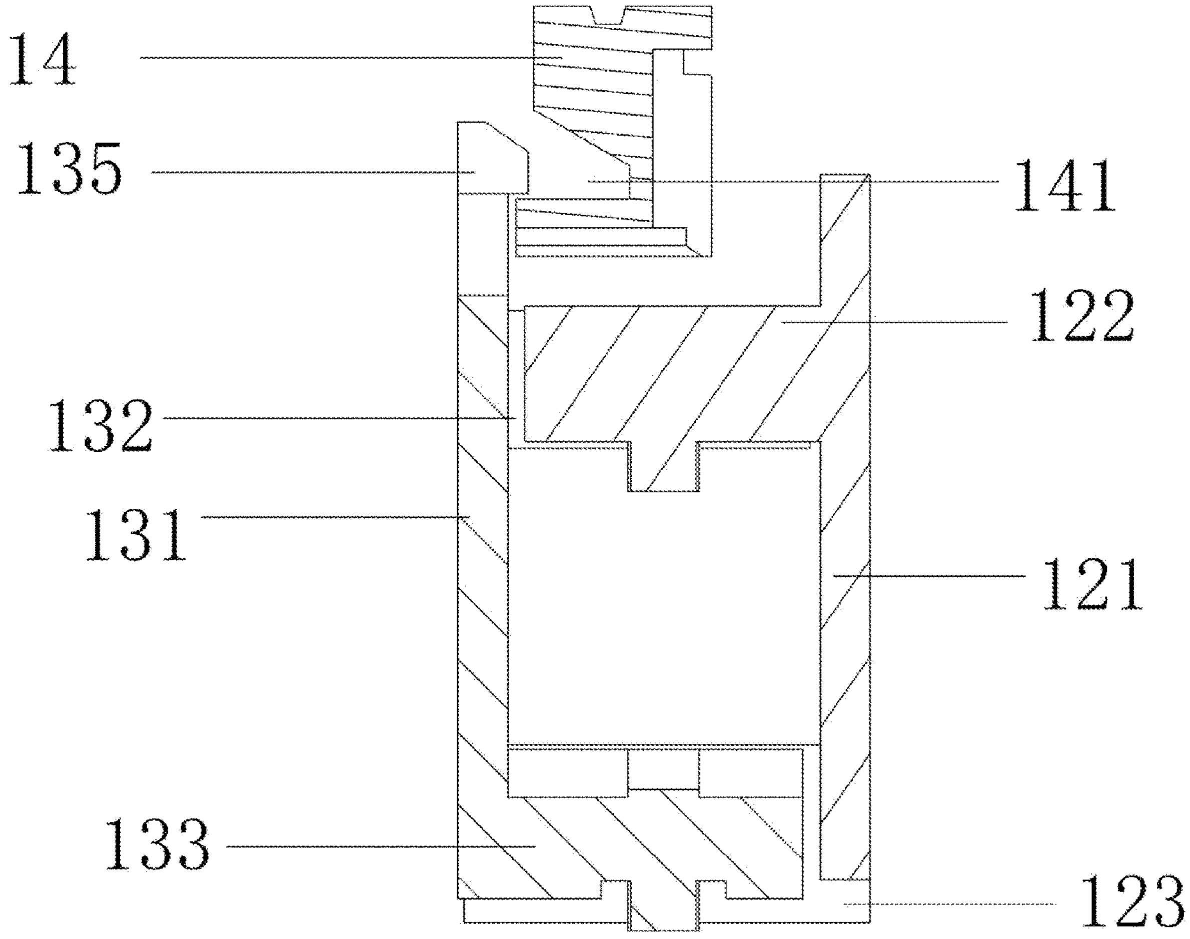
Figure 6C:
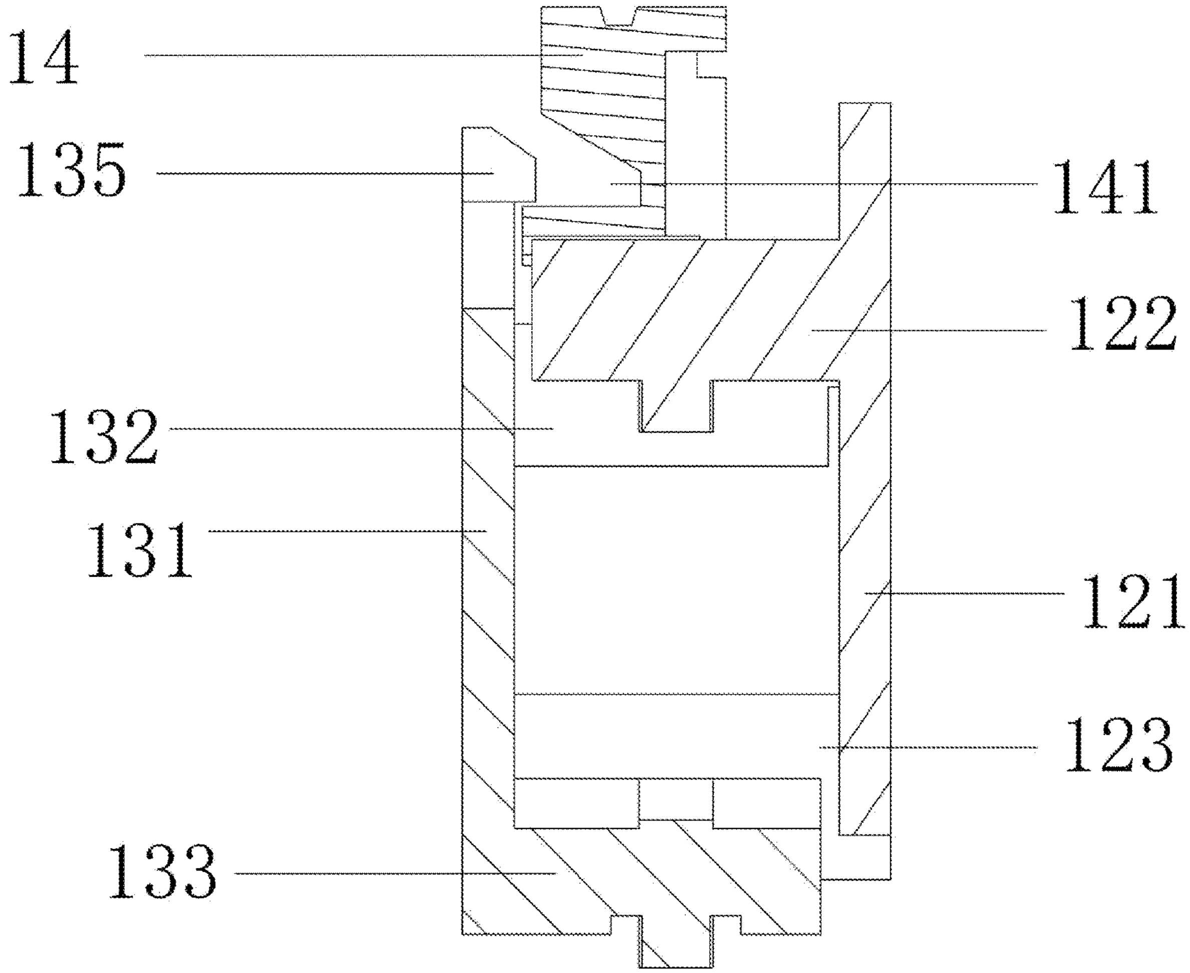
FIG. 6*c* is a sectional view of a first sliding structure, a second sliding structure, a third sliding structure, a base plate, and a socket upper cover in a socket with a safety shutter in a second usage state.
Figure 7A:
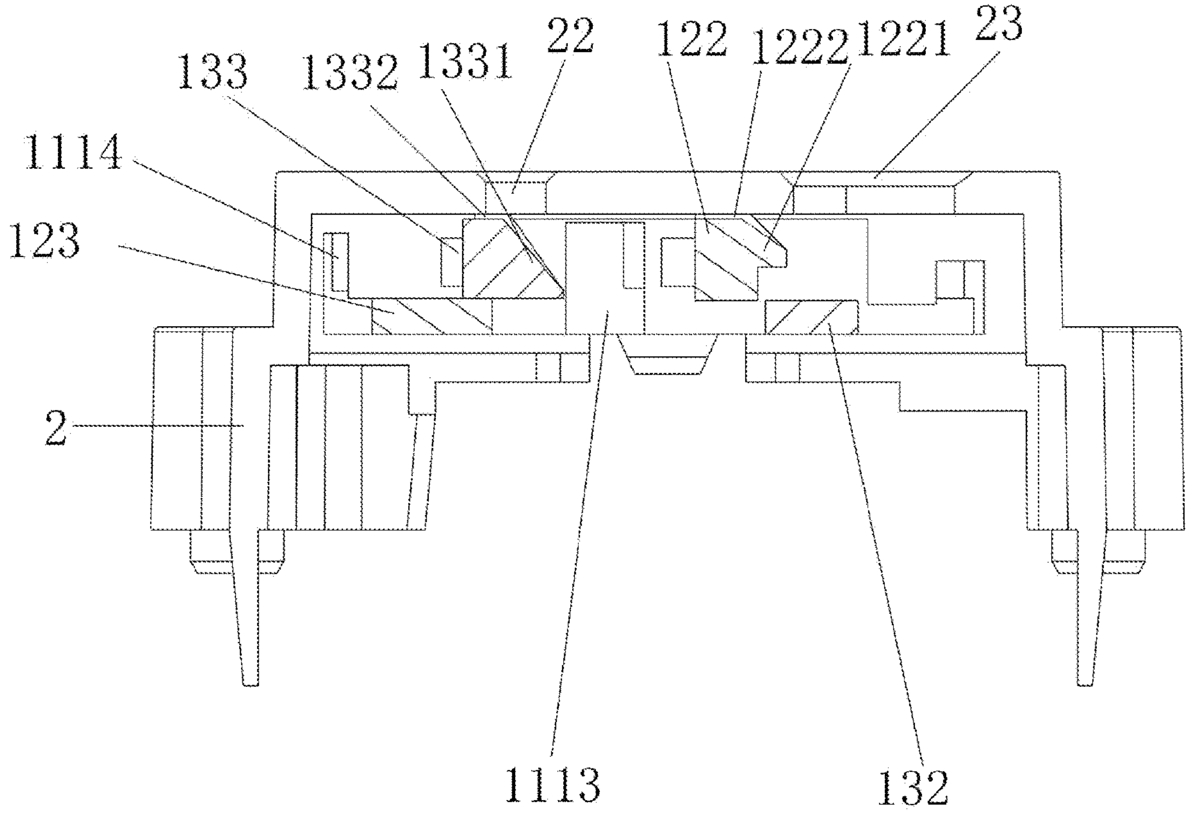
FIG. 7*a* is a sectional view of a first sliding structure, a second sliding structure, a third sliding structure, a base plate, and a socket upper cover in a socket with a safety shutter in a fourth usage state.
Figure 7B:
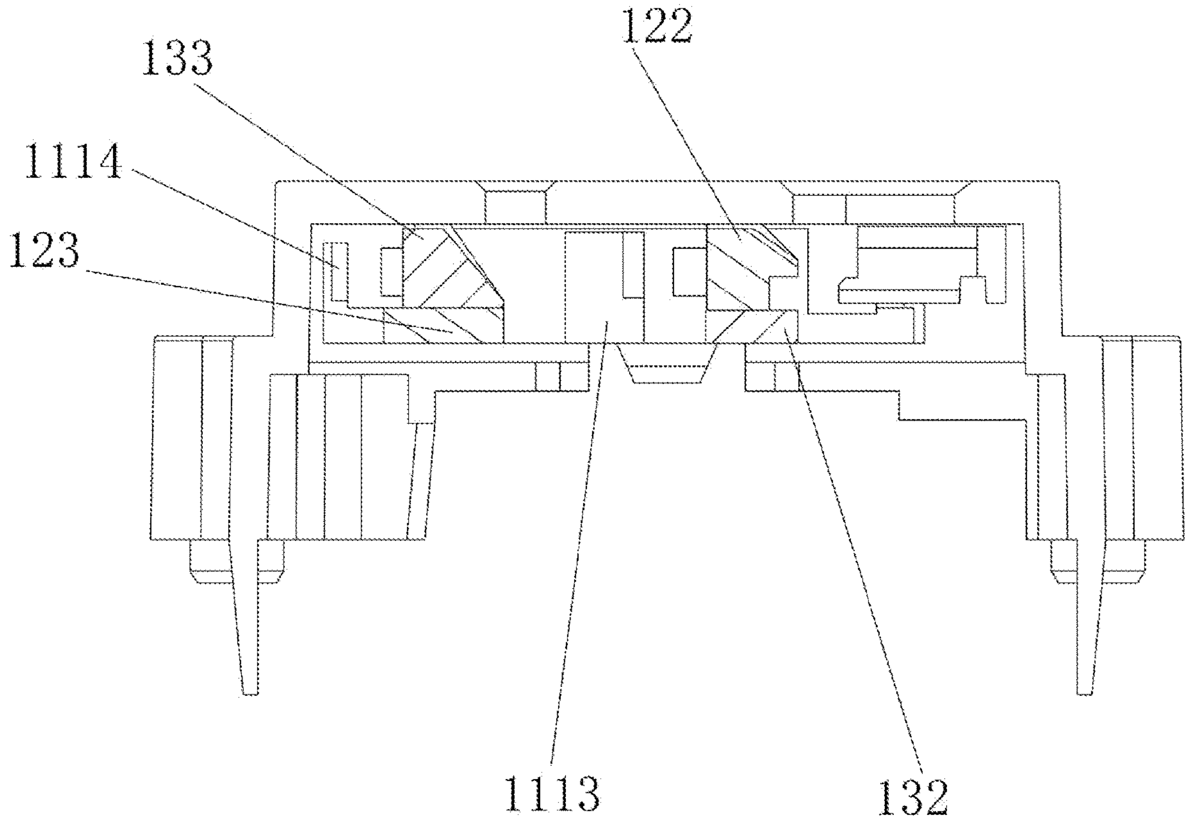
FIG. 7*b* and FIG. 7*c* are sectional views of a first sliding structure, a second sliding structure, a third sliding structure, a base plate, and a socket upper cover in a socket with a safety shutter in a fifth usage state.
Figure 7C:
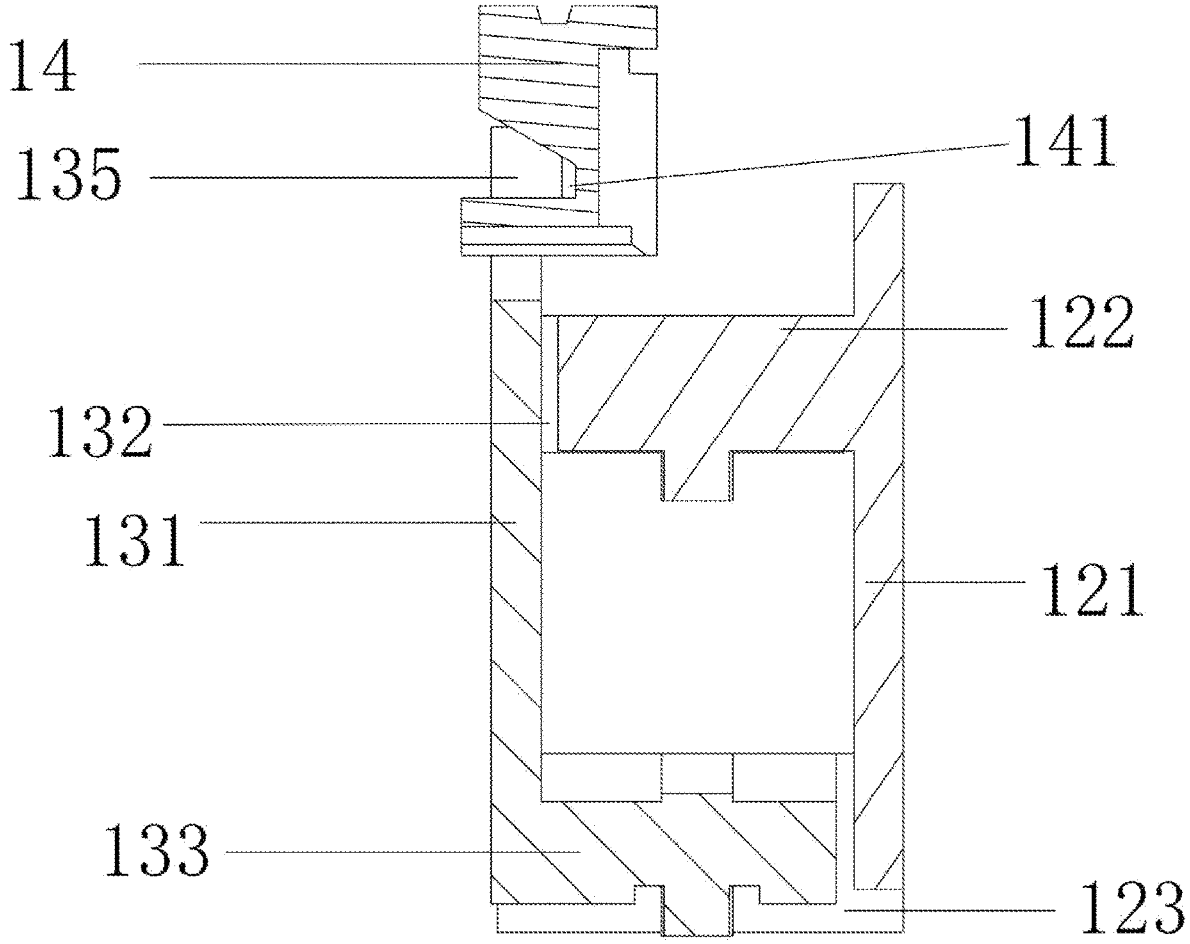

A working principle of the socket with the safety shutter of this embodiment is as follows: As shown in FIG. 5, in an idle state, the first sliding block 122 and the T-shaped jack 23 are both located right above the third sliding block 132, and the second sliding block 123 and the I-shaped jack 22 are both located right above the fourth sliding block 133. The limiting block 135 resists against the third sliding structure 14. As shown in FIG. 6*a* and FIG. 6*b*, in the first usage state, when a plug that is of the same type as the standard 5-15P plug is normally plugged into the socket, two plug pins respectively press the first guide inclined block 1222 and the second guide inclined block 1332 to drive the first sliding structure 12 and the second siding structure 13 to move towards the first spring 124 and the second spring 134 respectively, and the springs retract to fix the plug till the plug pins are completely plugged into the first conducting plate 32 and the second conducting plate 33. As shown in FIG. 6*c*, in the second usage state, when a plug that is of the same type as the standard 5-20P plug is normally plugged into the socket, a longitudinal plug pin and a transverse plug pin respectively press the first guide inclined block 1222 and the second guide inclined block 1332 to drive the first sliding structure 12 and the second siding structure 13 to move towards the first spring 124 and the second spring 134 respectively, and the springs retract to fix the plug. At this time, the limiting block 135 is aligned with the groove 141. The longitudinal plug pin performs further pressing to drive the third sliding structure 14 to slide along the guide bulge portion 1117. At this time, the longitudinal plug pin and the transverse plug pin are respectively aligned with the second conducting plate 33 and the first conducting plate 32 and continue to perform pressing, to plug the plug into the socket. In the third usage state, when a foreign matter is plugged into a longitudinal opening of the T-shaped jack 23, the limiting block 135 resists against the third sliding structure 14, so that the plugging fails. As shown in FIG. 7*a*, in a fourth usage state, when a foreign matter is plugged into a transverse opening of the T-shaped jack 23, the first sliding structure 12 is driven to move towards the first spring 124. However, due to the blockage of the third sliding block 132, the foreign matter cannot be continued to be plugged. As shown in FIG. 7*b*, in a fifth usage state, when a foreign matter is plugged into the I-shaped jack 22, the second sliding structure 13 is driven to move towards the second spring 134. However, due to the blockage of the second sliding block 122, the foreign matter cannot be continued to be plugged. However, a sixth usage state is achieved under the condition of the fifth usage state. As shown in FIG. 7*c*, the limiting block 135 is aligned with the groove 141. If there is another foreign matter being plugged into the longitudinal opening of the T-shaped jack 23 at this time, the third sliding structure 14 can be driven to slide along the guide bulge portion 1117 and is plugged into the second conducting plate 33, which will cause a certain risk. This case difficultly occurs in the sixth usage state, which will not be discussed here.

In summary, due to the adoption of the above technical solution, compared with the prior art, the socket with the safety shutter of this embodiment has the following beneficial effects:

1. The socket can better adapt to an ordinary two-pole plug (for example, a standard 5-15P plug) and a T-shaped plug (for example, a standard 5-20P plug). Furthermore, under the protection of the sliding structures of the safety shutter, a plug is easily plugged into the socket and fixed; substances such as external dust and water in air can be effectively isolated; and aging of electrical elements inside the socket is relieved.

2. Since the first sliding structure and the second sliding structure are connected in the interpenetrating manner, the structure is stable. During use, the two sliding structures are not easily misaligned, which avoids locking of the safety shutter device. A two-pole plug can be normally plugged into the socket, and a foreign matter can be prevented from being plugged into the I-shaped jack or the T-shaped jack alone, so as to avoid the foreign matter from being plugged into a conducting plate, leading to a danger of electric shock or the like.

3. The base plate is provided with the reverse placement prevention bulge portion, so that problems, caused by reverse placement of the safety shutter device, that a plug cannot be plugged into a jack and that the socket is damaged when a plug is plugged are avoided. The fastener and the mounting guide slot on the socket upper cover respectively cooperate with the clamping member and the mounting block on the socket base, so that a socket unit is convenient to assemble and disassemble, and has relatively good stability.

What is claimed is:

1. A socket with a safety shutter, comprising a safety shutter device (1), a socket upper cover (2), and a socket base (3), wherein the safety shutter device (1) comprises a base plate (11), and a first sliding structure (12), a second sliding structure (13), and a third sliding structure (14) which are slidably connected in the base plate (11); the first sliding structure (12) and the second sliding structure (13) are connected in an interpenetrating manner; a plurality of jack groups are formed in the socket upper cover (2); each jack group comprises a grounding jack (21), an I-shaped jack (22), and a T-shaped jack (23); gaps of a reset button and a test button are further formed in the socket upper cover (2); and the socket base (3) is provided with a grounding conducting plate (31) and a first conducting plate (32) corresponding to the grounding jack (21) and the I-shaped jack (22) respectively, and a second conducting plate (33) corresponding to the T-shaped jack (23);

wherein the base plate (11) comprises a plurality of sliding block slots (111) and connecting rods (112) between the sliding block slots (111); and each sliding block slot (111) is provided with a reverse placement prevention bulge portion (1111), a first limiting bulge portion (1112), a second limiting bulge portion (1113), and a third limiting bulge portion (1114).

2. The socket with the safety shutter according to claim 1, wherein the first sliding structure (12) comprises a first Z-shaped side plate (121), a first sliding block (122), and a second sliding block (123); the first sliding block (122) is fixed at an upper end of the first Z-shaped side plate (121); the second sliding block (123) is fixed at a lower end of the first Z-shaped side plate (121); the first sliding block (122) is slidably connected into a first sliding chute (1115) of the base plate (11) and is connected to the second limiting bulge portion (1113) through a first spring (124); and the second sliding block (123) is slidably connected into a second sliding chute (1116) of the base plate (11).

3. The socket with the safety shutter according to claim 2, wherein a first trapezoid convex block (1221) and a first guide inclined block (1222) are arranged on the first sliding block (122).

4. The socket with the safety shutter according to claim 1, wherein the second sliding structure (13) comprises a second Z-shaped side plate (131), a third sliding block (132), and a fourth sliding block (133); the third sliding block (132) is fixed at an upper end of the second Z-shaped side plate (131); the fourth sliding block (133) is fixed at a lower end of the second Z-shaped side plate (131); the third sliding block (132) is slidably connected into the first sliding chute (1115) of the base plate (11) and is connected to the third limiting bulge portion (1114) through a second spring (134); and the fourth sliding block (133) is slidably connected into the second sliding chute (1116) of the base plate (11).

5. The socket with the safety shutter according to claim 4, wherein a second trapezoid convex block (1331) and a second guide inclined block (1332) are arranged on the fourth sliding block (133).

6. The socket with the safety shutter according to claim 4, wherein a limiting block (135) is arranged at a front end of the second sliding structure (13); the third sliding structure (14) is provided with a groove (141) in a relative position of the limiting block (135); the third sliding structure (14) is provided with a guide sliding chute (142); and the guide sliding chute (142) is slidably connected to a guide bulge portion (1117) in each sliding block slot (111).

7. The socket with the safety shutter according to claim 2, wherein the first sliding block (122) is higher than the third sliding block (132); the second sliding block (123) is lower than the fourth sliding block (133); the second sliding block (123) resists against a bottom of the second Z-shaped side plate (131); and the third sliding block (132) resists against a bottom of the first Z-shaped side plate (121).

8. The socket with the safety shutter according to claim 1, wherein the socket base (3) is further provided with a connecting plate (36), a test button vertically penetrating through the connecting plate (36).

9. The socket with the safety shutter according to claim 1, wherein the socket upper cover (2) is clamped on a clamping member (34) of the socket base (3) through a fastener (24); and the socket upper cover (2) sleeves a mounting block (35) of the socket base (3) through a plurality of mounting guide slots (25).

* * * * *